Feb. 7, 1967 E. H. MUMFORD ETAL 3,303,013
TAKEOUT APPARATUS FOR GLASS FORMING MACHINES
Filed April 28, 1961 6 Sheets-Sheet 3

INVENTORS
E. H. Mumford & A. W. Rieck
BY
D. T. Innis &
W. A. Schaich
Attorneys

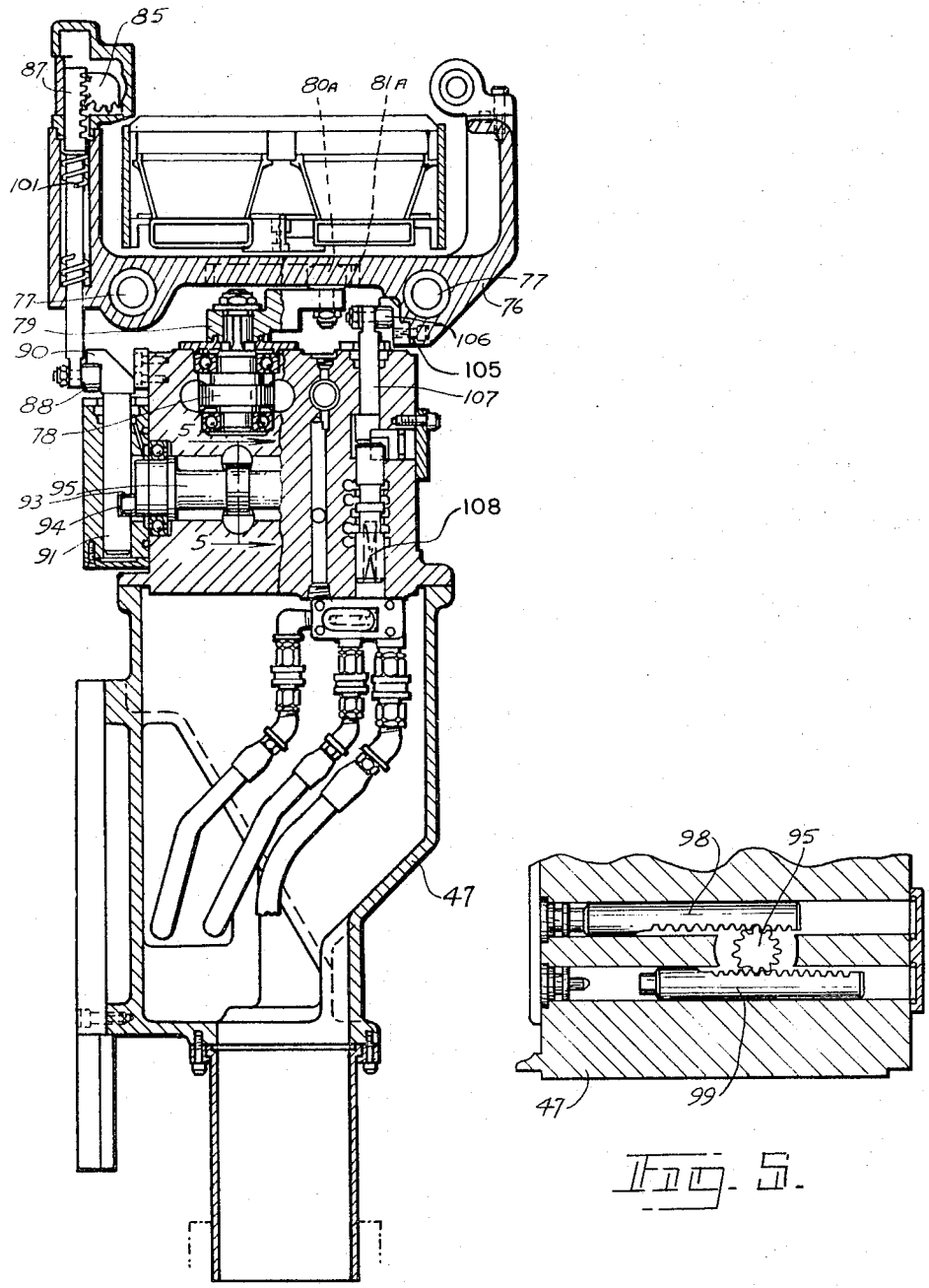

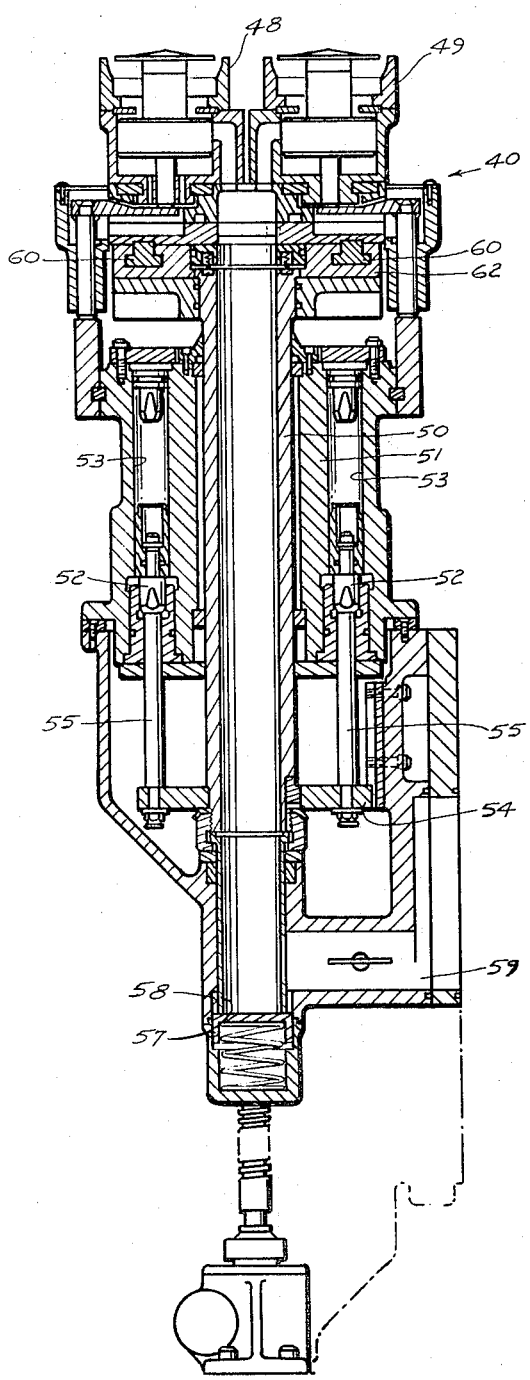
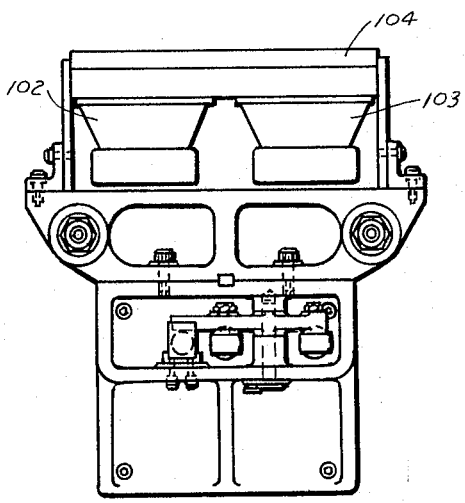

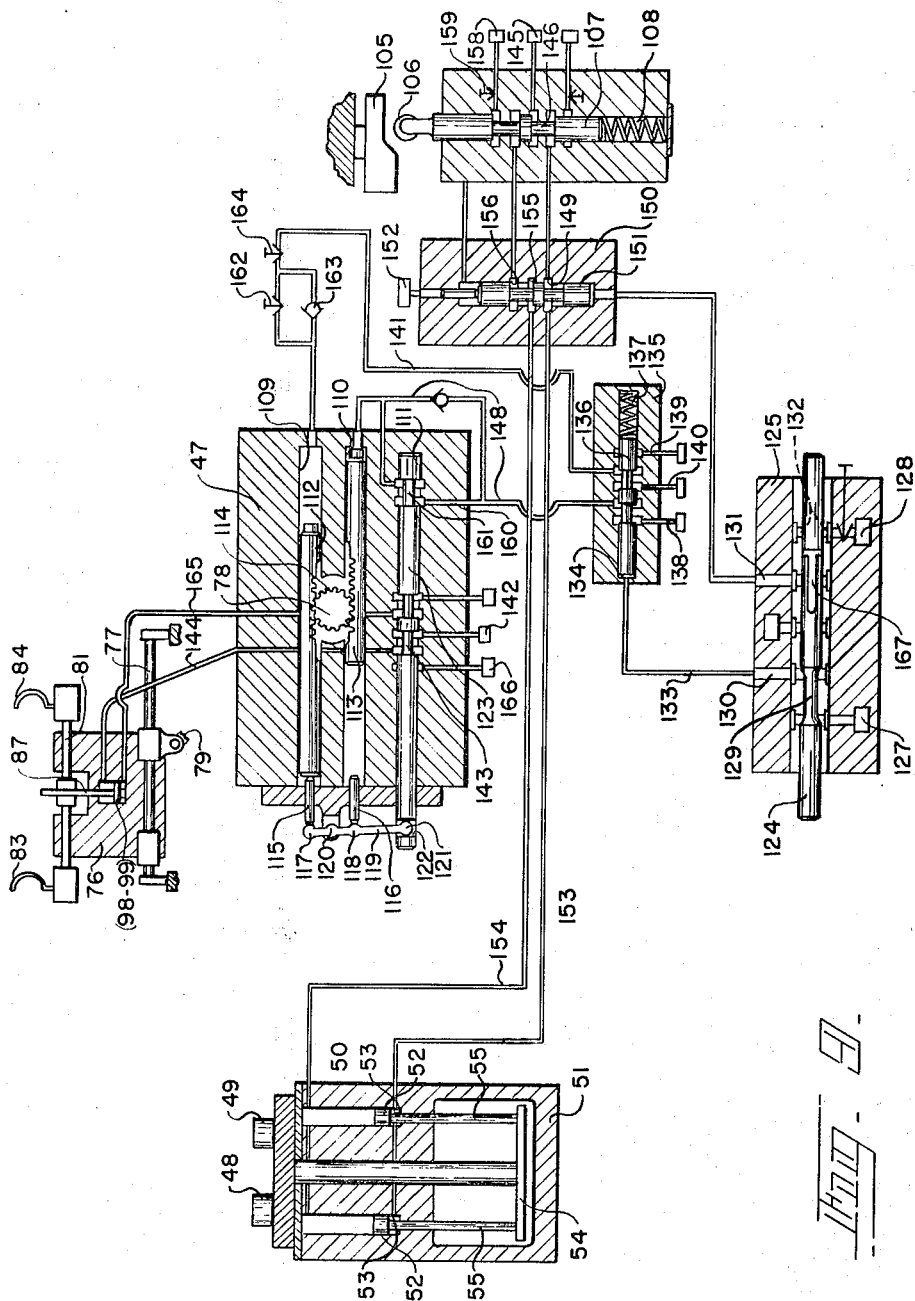

3,303,013
TAKEOUT APPARATUS FOR GLASS FORMING MACHINES

Eustace H. Mumford, Ottawa Lake, Mich., and Albert W. Rieck, Waterville, Ohio, assignors to Owens-Illinois, Inc., a corporation of Ohio
Filed Apr. 28, 1961, Ser. No. 106,307
2 Claims. (Cl. 65—260)

This invention relates to apparatus for forming glass articles, and in particular, to a mechanism for receiving formed glass articles and transferring them to a conveyor.

In present day machines, it is the practice to remove glass articles from the forming machine by supporting the articles from the top, or neck in the case of bottles, and lifting the bottle from the blow mold and positioning them on a wind box or cooling plate. In forming machines of another type, wherein the container is moved to a takeout station by rotation of a turret, it is common practice to release the bottle directly to a conveyor. In this situation, it is necessary that the bottom of the bottle be sufficiently rigid and cooled so that placing the bottle on a conveyor will not distort the bottle.

In the present invention, the blown or completely formed ware is carried to the takeout station by rotation of a neck mold carrying turret. At the takeout station, the neck molds are opened while at the same time the ware lowering device is positioned in contact with the bottom surface of the ware. The ware lowering mechanism is then lowered to a predetermined horizontal plane and the ware carried thereby is laterally transferred from the support to a wind box.

After a successively formed article is positioned at the takeout station, received by the vertically reciprocable ware support and lowered into the plane of the wind box, the mechanism for laterally transferring this successively formed article to the wind box moves the previously positioned bottle from the surface of the wind box onto a continuously moving conveyor.

It is an object of this invention to provide mechanism for receiving finished ware from the forming machine and to position and transfer the received ware to the conveyor.

It is an additional object of this invention to provide apparatus for lowering and transferring formed articles from the forming machine which is capable of high speed operation.

It is a still further object of this invention to provide apparatus for lowering and transferring formed articles from a forming machine in which the complex motions are interrelated to insure proper timing between operations carried out by the mechanism.

Other and further objects of this invention will be apparent from the following detailed description taken in conjunction with the accompanying drawings wherein:

FIG. 4 is a cross-sectional elevation taken generally at line 4—4 on FIG. 3.

FIG. 5 is a cross-sectional view taken at line 5—5 on FIG. 4.

FIG. 7 is a cross-sectional elevation taken at line 7—7 on FIG. 2.

FIG. 8 is an elevational view of the ware cooling wind box of the invention.

FIG. 9 is a schematic hydraulic circuit illustrating the functional elements of the invention and their interconnections.

Figure 1:
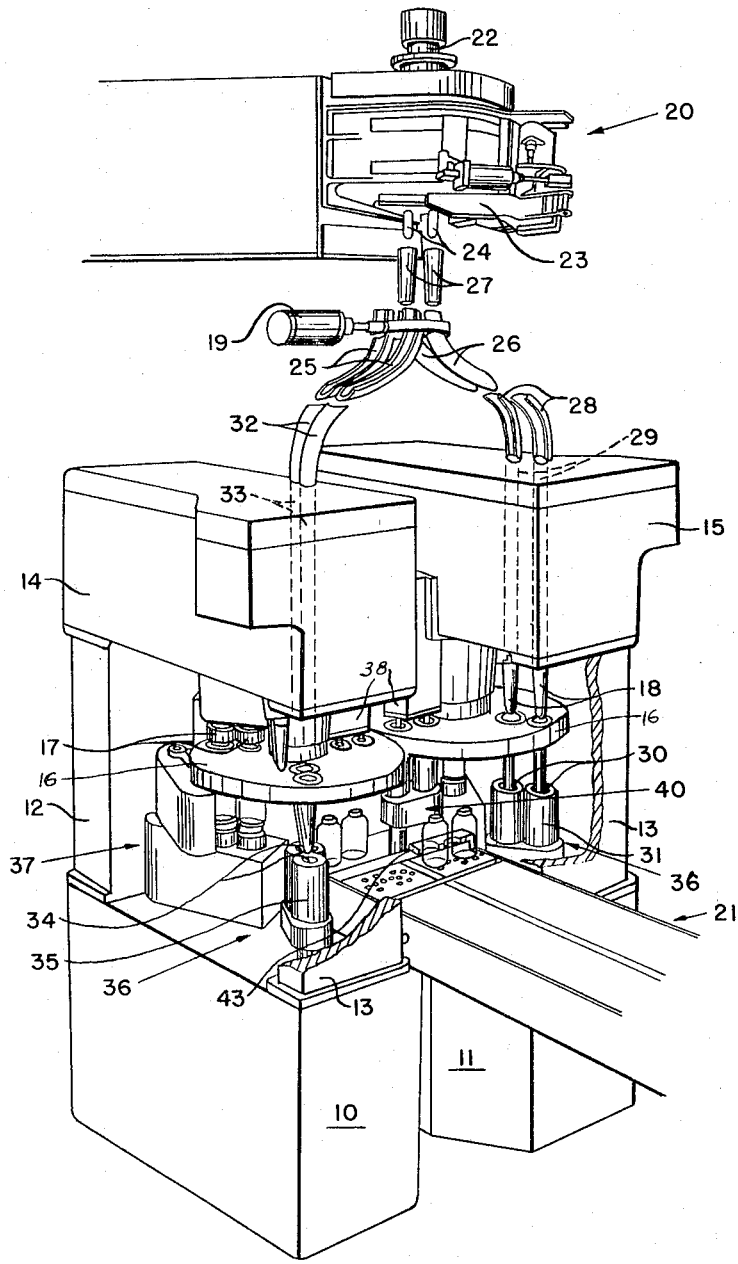
FIG. 1 is a schematic perspective view of the glass forming unit incorporating the invention.

Referring to the drawings and in particular to FIG. 1 thereof, 10 and 11 indicate the base members of a left-hand and right-hand machine, respectively. Extending vertically upward from said bases, are support columns 12 and 13 which are adapted to support the upper frame structures 14 and 15 of each respective machine. These upper frame structures enclose and contain the several driving mechanisms for the various parts of each machine, such as the drive for turrets 16, blow heads 17, plunger mechanism 18 and gob guide actuating cylinder 19.

These machines are designed and built as right and left-hand units and are so positioned beneath a gob feeding device 20. They are also positioned on opposite sides of ware conveyors 21 which are adapted to receive the blown ware from these machines (FIG. 1). It is to be noted that the turrets 16 are arranged to index in opposite directions but with their peripheral surfaces moving in the same direction at the takeout point adjacent the end of the ware receiving conveyors 21. The turrets 16 are indexed by a hydraulic indexing mechanism, the details of which are fully disclosed in a copending application Ser. No. 806,957, filed April 16, 1959, now Patent No. 3,009,444, and owned by the assignee of this application.

The glass feeding device 20, as illustrated in FIG. 1, is the usual well-known double gob feeder and is comprised of the usual members, such as a gob feeding plunger 22 and cut off device 23, which is adapted to simultaneously sever a pair of gobs of molten glass 24. Gob guiding members 25 and 26 are provided below the feeder and above the machines and are adapted to be presented alternately beneath a pair of funnels 27 to guide the gobs 33 alternately to the machines.

As shown in FIG. 1, the gob guides 26 are positioned beneath the feeder in a position to receive the gobs 24 and to guide them into inclined gob chutes 28 and thence into vertically disposed gob guides 29 which extend through the upper frame structure 15 and are in alignment with a pair of cavities 30 of a blank mold 31.

With the reception of the gobs in the first set of chutes 28, the cylinder 19 is actuated to remove the first set of deflectors 26 and bring the second set 25 into position to receive a succeeding pair of gobs 24. This succeeding pair of gobs is fed to the deflectors 25 and from these, the gobs will be deflected into the inclined chute 32, thence into the vertical gob guides 33 and to the cavities 34 of a second blank mold 35 on the right-hand machine. The tie between the feeder mechanism 20 and the operation of the machines is carried out by a synchro-tie electronic mechanism inserted between the motor drive of the machines and the motor drive of the feeder. This is a well-known expedient and is not only disclosed in several issued patents but is and has been in commercial use for many years.

Each forming machine is an organization of shaping mechanisms and each incorporates, as such, a parison mold unit 36, a parison blowing unit 37 and a takeout unit 38. One of the takeout units will be separately described hereinafter.

Referring now to FIGS. 2 to 5, the details of the mechanism for supporting and lowering the finished ware and laterally transferring ware onto a conveyor are shown.

A ware supporting and lowering mechanism 40 and a horizontal transfer means 43 are mounted on a common support 47 which in turn is mounted on the base of the forming machine. The ware lowering mechanism 40, as illustrated in FIG. 7, is provided at its upper surface with two ware receiving heads 48 and 49. The heads are connected to the top end of a hollow tubular member 50 which extends downward through an opening formed in a fixed supporting structure 51 mounted on the support 47.

A pair of pistons 52 are slidably received in cylinders 53 formed in said fixed supporting structure 51. The lower ends of the pistons 52 are connected to a crosshead 54 by means of rods 55. The cross-head 54 is fixed at its center to the hollow tubular member 50. Introduction of fluid under pressure to the underside of the pistons 52 will result in moving the cross-head 54 and the hollow tubular member 50 in a vertical direction thus raising the ware receiving heads 48 and 49 into approximate engagement with the ware positioned at the takeout station and still retained in the neck rings.

Introduction of fluid under pressure into the cylinders 53 above the pistons 52 will result in lowering of the heads 48 and 49. The tubular member 50 is made hollow so as to provide means for conveying cooling air from the base to the movable heads 48 and 49. In order to insure that no leakage of the air takes place during the reciprocation of the tubular member 50, an extension sleeve 57 is connected to the lower end of the tubular member 50 in coaxial alignment therewith and is adapted to telescope within the air inlet chamber 58 in the support 47. The sleeve 57 when in the down position as shown in FIG. 7 will effectively close off a side opening air inlet port 59. However, upon vertical movement of the hollow tubular member 50 and the sleeve 57, the air inlet port 59 will be opened to the interior of the sleeve 57.

Figure 2:
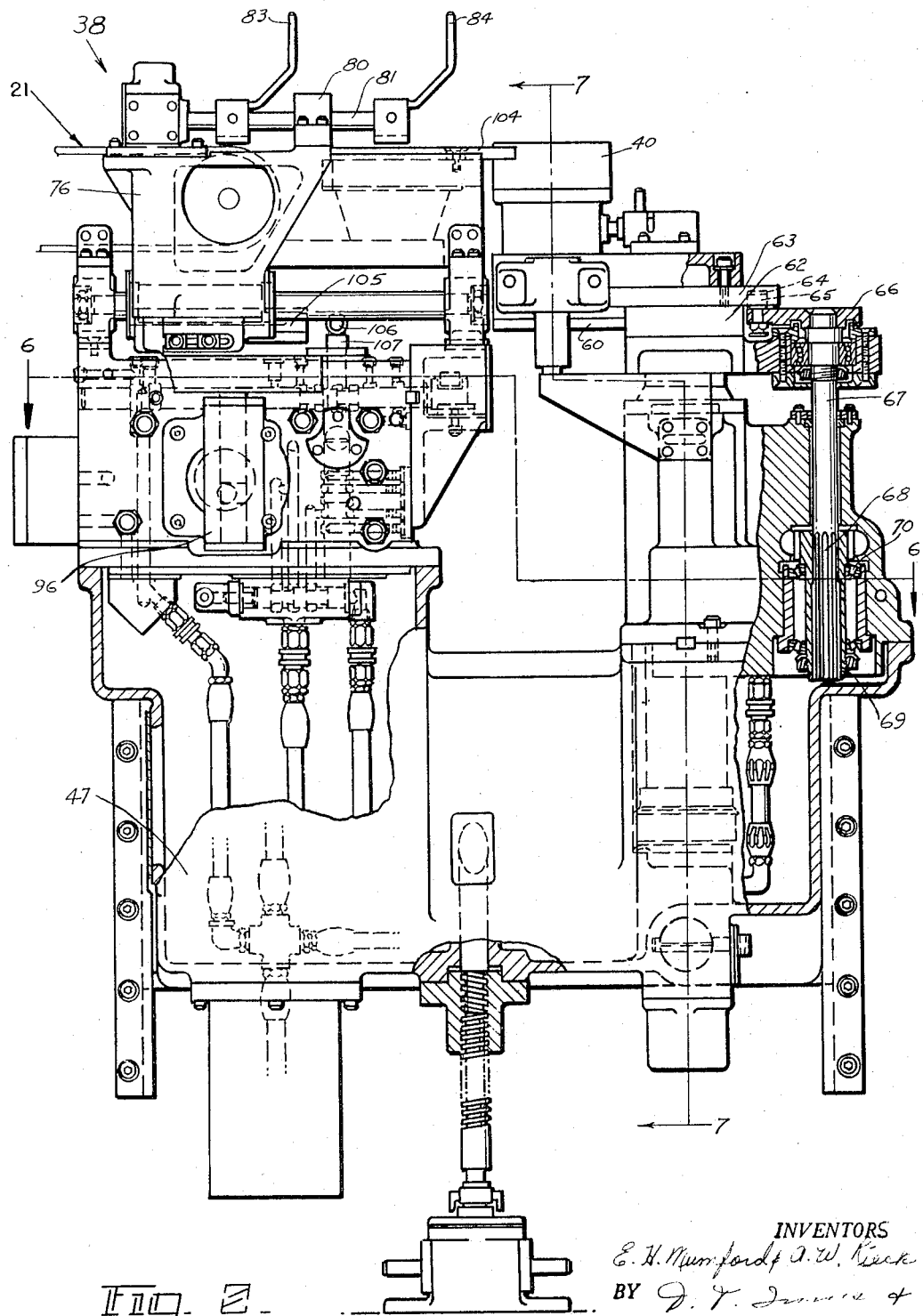
FIG. 2 is a schematic side elevation of the ware removal mechanism of the invention.

As can best be seen when veiwing FIG. 2, the ware lowering mechanism 40 has a pair of horizontal T members 60 which are adapted to ride in T slots 61 formed in the upper surface of a plate 62. The plate 62 is connected to the upper end of the hollow tubular member 50. The T members 60 are in turn connected to a second plate 63 which slides over the top of the plate 62. The plate 63 at one end thereof has a slot 64 formed in the under surface thereof. The slot 64 is adapted to receive a roller 65. The roller 65 is connected to one end of a horizontal crank arm 66 which is connected at its other end to the upper end of a vertical shaft 67. The shaft 67 is supported in an opening formed in the fixed supporting structure 51. The lower end of the shaft 67 is vertically splined at 68 with the splined end being adapted to reciprocate within a cooperating internally splined sleeve 69. The sleeve 69 is supported for rotation in the fixed supporting structure 51 by bearing means 70. The upper part of the sleeve 69 is provided with radially extending gear teeth 71 about the outer circumference thereof. A pair of horizontal openings 72 and 73 are formed in the supporting structure 51 on opposite sides of the gear portion 71 of the sleeve 69. Within these openings 72 and 73 are adapted to slide pistons 74 and 75. The pistons 74 and 75 serve as racks which cooperate with the gear teeth 71 formed on the sleeve 69.

Figure 6:
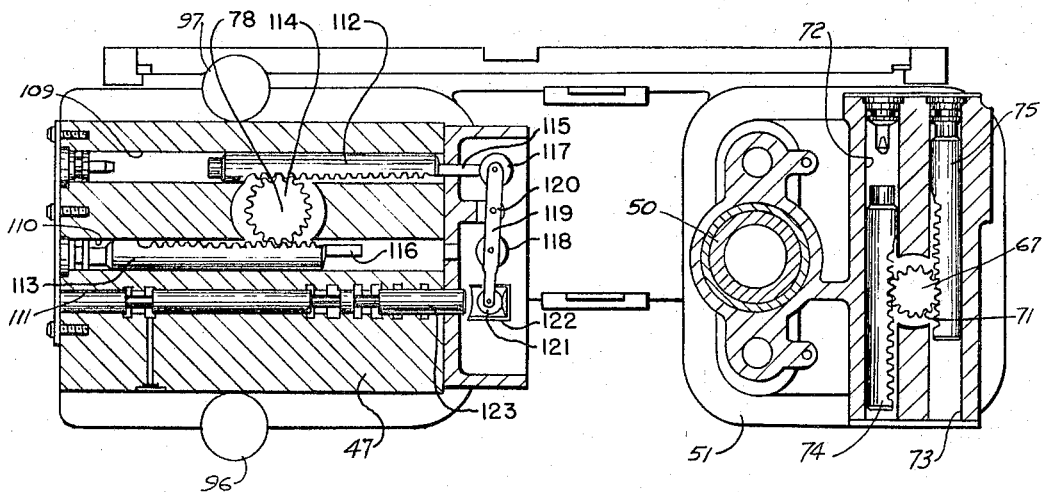
FIG. 6 is a cross-sectional view taken at line 6—6 on FIG. 2.

As can be seen from viewing FIG. 6, actuation of the piston 75 will result in rotation of the shaft 67 in a clockwise direction and actuation of the piston 74 will result in rotation of the shaft 67 in a counter-clockwise direction.

The introduction of fluid under pressure to these two pistons 74 and 75 is selective on the part of the machine operator and will result in moving the ware lowering mechanism 40 to the right as viewed in FIG. 2 to render the mechanism 40 inoperative to lower or receive bottles.

This is particularly advantageous during the start up period of the machine when the mold parts have not become sufficiently heated and good bottles are not being made. During this warm up period the mechanism 40 is moved out of the position shown in FIG. 2 and as the neck molds are opened to release the ware, the ware will drop clear of the machine usually into a cullet chute, not shown.

Under normal operation of the machine after the warm up period the mechanism 40 will remain in the vertical plane as shown in FIG. 2 and will reciprocate vertically in axial alignment with the formed bottles positioned at the takeout station by the neck molds.

The horizontal transfer means 43 takes the form of a U shaped member 76 mounted for horizontal movement on a pair of parallel rails 77. The rails 77 extend from a point adjacent the ware lowering mechanism 40 to a point under-lying the conveyor 46. A vertical shaft 78, having radially extending gear teeth about the circumference thereof, is mounted for rotation in the supporting structure 47 below the U shaped member 76. The upper end of the shaft 78 is fixed to one end of a horizontal crank arm 79 and rotation of shaft 78 is adapted to move the crank arm 79 through approximately 180° arc. The outer end of the crank arm 79 carries an upstanding roller 80A which is received in a slot 81A formed in the bottom of the U shaped member 76. The slot 81A is elongated in a transverse direction to the direction of movement of the U shaped member 76. Thus, rotation of the shaft 78 and consequent operation of the crank arm 79 will result in sliding the U shaped member 76 on its supporting rails 77. The tops of the U shaped member carry pairs of spaced horizontal bearings 80 within which horizontal shafts 81 and 82 are adapted to rotate about the longitudinal axes. The shafts 81 and 82 have radially outwardly extending arms 83 and 84 clamped thereto which are adapted to contact the formed ware during operation. One end of the shafts 81 and 82 carry spur gears 85 which are adapted to be rotated by vertically reciprocable racks 86 and 87. The racks 86 and 87 are mounted in the vertical arms of the U shaped member 76 for vertical movement with their rack portions at the upper end thereof. The lower ends of the racks 86 and 87 carry rollers 88 and 89 respectively. The rollers 88 and 89 are adapted to ride beneath elongated overhanging ledges 90 formed on the upper end of vertically reciprocated shafts 91 and 92. As can best be seen in FIG. 4, the shaft 91 has a horizontal slot 93 formed in one side thereof within which a roller 94 is adapted to be received. The roller 94 is eccentrically mounted on one end of a horizontally extending shaft 95. The shaft 95 extends substantially the full width of the support structure 47 and at its other end carries a second roller (not shown) which is adapted to ride in a similar slot formed in a second vertical shaft 92. The shafts 91 and 92 are guided by members 96 and 97 within which the shafts are mounted for vertical reciprocable movement. The shaft 95 is oscillated by a pair of piston racks 98 and 99 which engage radial gear teeth 100 formed on the shaft 95 at diametrically opposed sides thereof. Thus it can be seen that alternate actuation of the racks 98 and 99 will result in rotation of the shaft 95 which in turn will vertically reciprocate the shafts 91 and 92. The overhanging ledges 90 are elongated horizontally in the direction of movement of the U shaped member so as to always remain in engagement with the rollers 88 and 89 during reciprocating movement of the U shaped members 76. Vertical motion of the overhanging ledges 90 permit the racks 86 and 87 to move vertically under the action of springs 101. This vertical motion of the racks 86 and 87 results in rotation of the spur gears 85 resulting in rotation of the shafts 81 and 82. With the springs used as the power for moving the radial arms 83 and 84 toward the longitudinal center of the takeout mechanism, there is less likelihood of jamming the arms against incorrectly positioned ware. The force of the spring 101 is not great enough to force the arms 83 and 84 toward the center of the takeout mechanism when something is blocking this movement.

Positioned between the ware lowering mechanism 40 and the conveyor 21 are a pair of wind boxes 102 and 103 which direct cooling air through a cover plate 104 having a plurality of holes therethrough.

As shown in FIG. 8 the wind boxes 102 and 103 are positioned side-by-side and the cover plate 104 overlies both wind boxes. The cover plate lies in the same horizontal plane as the top of the ware lowering mechanism 40 when it is retracted.

Figure 3:
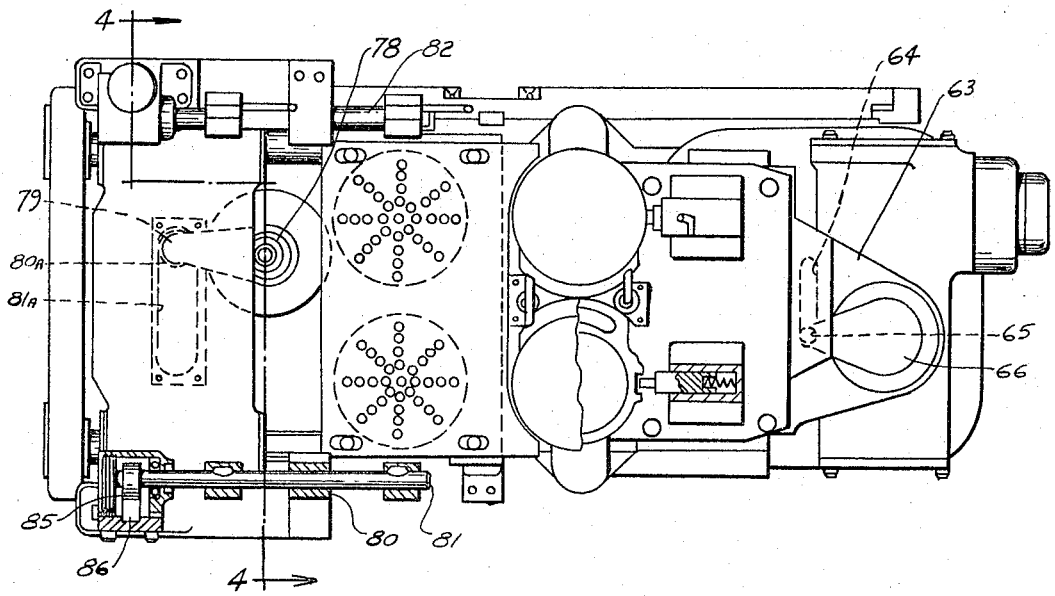
FIG. 3 is a top plan view of the mechanism of FIG. 2.

When the U shaped member 76 is moved to the right from its position shown in FIGS. 2 and 3, and during its movement to the right, a horizontal cam element 105, which is carried by the U shaped member will move to the right and engage a roller 106 and move the roller 106 in a downward direction. The roller 106 is connected to the top of a vertically disposed spool valve 107, as best shown in FIG. 4. The spool valve 107 is biased vertically by means of a spring 108 acting against the bottom of the spool valve. The function of this spool valve 107 will be explained later in connection with the description of FIG. 9.

The mechanism for driving the U shaped member 76 is best illustrated in FIG. 6 at the left-hand side thereof.

The fixed supporting structure 47 has three parallel, horizontal passages 109, 110 and 111 formed therein with two of the passages 109 and 110 tangentially passing diametrically opposed sides of the vertical shaft 78. Within the two passages 109 and 110 are positioned piston racks 112 and 113 which mesh with a spur gear 114 formed on the shaft 78. The racks 112 and 113 have piston heads at one end which, in cooperation with the passages 109 and 110, form fluid motors for driving the racks. The ends of the racks 112 and 113, opposite the piston heads, are provided with stub shafts 115 and 116 which extend through openings formed in the support 47. These stub shafts are intended to engage rollers 117 and 118 mounted on an arm 119. The arm 119 is pivotally mounted at 120 to a stationary portion of the machine support 47 intermediate the rollers 117 and 118.

Furthermore, the shaft 119 has a ball 121 formed on an extending end thereof which is adapted to seat within a socket 122 formed in an end of a spool valve 123 positioned in passage 111. The two stub shafts 115 and 116 will alternately engage their respective rollers causing pivotal movement of the arm 119 and axially shift the valve 123. The valve 123 controls the supply of fluid to the piston racks 98 and 99 which effect the rotation of the arms 83 and 84 into and out of horizontal position. This function will be described later with reference to FIG. 9.

It should be pointed out at this time that arms 83 and 84 are oscillated from the position shown in FIG. 2 when the U shaped member 76 is moved toward the right and has reached the extreme of its movement toward the right.

With the arms 83 and 84 oscillated 90° so that arms 84 extend in back of ware positioned on the ware lowering mechanism 40, the U shaped member reverses its direction and moves toward the left with the arms 84 laterally transferring the ware from the heads 48 and 49 to the cover plate 104 over the wind boxes 102 and 103. When the U shaped member 76 approaches its extreme position to the left, the arms 83 and 84 are again returned to a vertical position and the above outlined operation repeats itself with successively formed ware being transferred from the heads 48 and 49 to the cover plate 104 by the arms 84 while the ware which was previously positioned on the cover plate 104 is moved therefrom by the arms 83 to the end of the conveyors 21 which convey the ware away from the machine.

Referring now to FIG. 9, a description of the operation of the previously described mechanism and their interrelations follows:

The main timing drive of the machine will carry cams which control the sequence of operation of the takeout mechanism by reciprocating the spool valve 124 which is slidably received within a passage formed in a valve block 125. The valve block has a source of fluid under pressure connected to a chamber 126 formed therein and contains two exhaust chambers 127 and 128. With the spool valve 124 positioned as shown in FIG. 9 pressure fluid from the chamber 126 is completely cut off and a reduced portion 129 of the valve 124 allows a port 130 to be connected to the exhaust chamber 127. A second port 131 is also connected to exhaust through undercut channels 132 formed in the spool valve 124. The port 130 is connected by a conduit 133 to one end of a chamber 134 formed in a valve block 135. A spool valve 136 is adapted to move horizontally within the chamber 134 and is normally biased to the left by a spring 137. Movement of the spool valve 124 to the right from the position shown, will permit fluid under pressure to pass from the chamber 126 to the port 130 where it will flow through conduit 133 to the chamber 134 formed in the valve block 135. This pressure will force the spool valve 136 to the right and compress the spring 137. The valve block 135 has two exhaust ports 138 and 139 formed therein on opposite sides of a pressure fluid inlet port 140. With the valve 136 positioned as shown, fluid under pressure will enter through the port 140 and pass out of the valve block through a conduit 141 which is connected to the passage 109 formed in the supporting structure 47.

Introduction of fluid to the passage 109 will result in the rack 112 being moved to the left to the position shown. Movement of the rack 112 to the left will rotate the pinion gear 78 in a counter-clockwise direction. Rotation of the pinion gear 78 will result in moving the U shaped member 76 to the left to the position shown. Rotation of the pinion gear 78 by the application of fluid under pressure to the piston rack 112 will necessarily move the piston rack 113 to the right to the position shown. Fluid under pressure which is forced out of the passage 110, by movement of the piston rack 113 to the right, will exhaust through a conduit 148 which, at this time, is connected to the exhaust port 138 in the valve block 135. When the rack 112 has nearly completed its movement to the left, it will move the stub shaft 115 against the roller 117 resulting in rocking the arm 119. The rocking motion of the arm 119 positions the spool valve 123 to the position shown. With the valve 123 in the position shown, fluid under pressure, from a source 142, will flow past the reduced portion 143 of the valve and through a conduit 144 to the piston racks 98 and 99 (schematically shown as a single piston). The application of fluid to the top of this single piston is the equivalent of feeding fluid under pressure to the piston rack 98 of FIG. 5 and will cause the racks 86 and 87 to move in a downward direction. This movement of the rack 87 down will result in rotating the shaft 81 in a counter-clockwise direction. Rotation of the shaft 81 will move the arms 83 and 84 into a vertical plane.

It should be understood at this time that the introduction of fluid to the piston rack 98 not only will rotate shaft 81 but will also rotate shaft 82 and the arms 83 and 84 carried thereby so as to position all the arms in a vertical plane.

Movement of the U shaped member to the left will also permit the spool valve 177 to assume the position shown. This occurs because the cam 105, which is carried by the U shaped member 76, disengages from the roller 106 carried on the upper end of the valve 107. With the valve 107 positioned as shown, fluid under pressure from a source 145 will flow past reduced portion 146 of the valve 107 and into conduit 147. The conduit 147 opens into an annular chamber 149 formed in a valve block 150. A spool valve 151 is mounted within the valve block 150 and is free to move vertically a limited extent. The spool valve 151 is biased in a downward direction by a constant pressure source 152 applied to the top of the valve 151.

Fluid under pressure entering the valve block 150 from the conduit 147 will pass through the valve block and into a conduit 153 which is connected to cylinders 53 below the pistons 52 of the mechanism for raising and lowering the ware support heads 48 and 49.

The cylinders 53 at their top ends are connected through a conduit 154 to an annular recess 155 formed in the valve block 150 vertically above the annular chamber 149. With valve 151 positioned as shown, the annular recess 155 is in communication with a third recess 156. The recess 156 is connected to a conduit 157 which, with the valve 107 positioned as shown, is connected to an exhaust chamber 158. In the passage to the exhaust chamber 158, there is a throttle valve 159 which will control the rate of exhaust of fluid from above the pistons 52 to the exhaust chamber 158. By reason of the fact that FIG. 9 illustrates the condition of the system which is present when the cam 105 has just left the roller 106, the system for raising the ware support heads 48 and 49 has just been activated and fluid under pressure above the pistons 52 will be pumped out through conduits 154 and 157 and through the throttle valve 159 to the exhaust chamber 158.

Under the control of a cam driven in synchronism with the machine drive, not shown, the valve 124 will be shifted to the right at which time the pressure chamber 126 will be connected to the port 130 and fluid under pressure will flow through the conduit 133 and shift the valve 136 to the right against the action of the spring 137. This shifting of the valve 136 to the right will connect the pressure port 140 to the conduit 148. The conduit 148 has a branch conduit 160 connected thereto through which the fluid under pressure will flow past an undercut portion 161 of the valve 123. After flowing past the undercut portion 161 of the valve 123, fluid will flow to the passage 110 formed in the supporting structure 47.

This introduction of fluid under pressure will force the piston rack 113 to the left resulting in rotation of the shaft 78. This rotation of the shaft 78 will be transmitted through the crank arm 79 to the U shaped member 76 and cause the member 76 to move to the right. At the same time the piston rack 112 will be moved to the right and fluid trapped within the passage 109 will be forced out through conduit 141 and flow past the spool valve 136 into the exhaust port 139 of the valve block 135. The conduit 141 has a parallel path arrangement in which one path has a throttle valve 162 and the other path has a check valve 163 therein. The check valve 163 is arranged to allow fluid to flow away from the passage 109. A second throttle valve 164 is positioned in the line 141 to control the rate of exhaust of fluid out of the chamber 109. When the conduit 141 carries fluid under pressure flowing in the direction of passage 109 both throttle valves 164 and 162 operate as rate control devices for the operation of the U shaped member. As the U shaped member 76 moves to the right, the cam 105 carried thereby will contact roller 106 and depress the valve 107 against the biasing spring 108. This shifting of the valve 107 results in connecting the source 145 of pressure fluid to the conduit 157 and fluid under pressure will flow therethrough and past the valve 151 into conduit 154 which is connected to the cylinders 53 above the pistons 52. This application of fluid under pressure above the piston 52 will effect the lowering of the ware support heads 48 and 49 into a position preparatory for having the ware transferred therefrom.

The continued movement of the rack 113 to the left with the consequent shifting of the U shaped member 76 to the right will, at the end of its stroke, cause the rack 113 to bear against the stub shaft 116 and force the stub shaft toward the left against the roller 118 on the arm 119. This force applied to the roller 118 will pivot the arm 119 about the pivot axis 120 in a clockwise direction and result in shifting the valve 123 to the left. Shifting of the valve 123 to the left will connect the pressure source 142 to a conduit 165 which is connected to the piston rack 99 of FIG. 5 represented as a single piston in FIG. 9.

This application of fluid pressure to the piston 99 will result in rotation of the shaft 81 in a clockwise direction and shaft 82 in a counter-clockwise direction therefore positioning the arms 83 and 84 in a horizontal plane above but parallel with the plane formed by the top of the ware lowering mechanism 40, wind box cover plate 104 and conveyor 21.

Fluid which was trapped above the piston 99 (in reality behind piston rack 98, FIG. 5) is forced out through the conduit 144 past the reduced portion 143 of the valve 123 to an exhaust chamber 166. Thus it can be seen that the arms 83 and 84 formed on both shafts 81 and 82 are now in position to sweep ware from the transfer heads 48 and 49 to the wind box cover plate 104 and from the wind box cover plate 104 to the conveyor 21. With the next shifting of the valve 124 back to the left the valve 136 will be returned to the position shown in FIG. 9 by the spring 137 and result in reversing the fluid pressure application to the pistons 112 and 113.

However, until the piston 112 approaches the end of its movement in the left-hand direction, the valve 123 will not be shifted and thus the arms 83 and 84 will not be rocked into a vertical plane until the U shaped member 76 has substantially completed its horizontal movement to the left.

The main control valve 124 serves an additional function when it is desired to shut down the ware transfer mechanism. In order to accomplish this, the valve 124 is rotated 90° at which time the channel 167 formed therein will allow fluid under pressure from the chamber 126 to flow through the port 131 into a conduit 168 which is connected to the valve block 150 and opens into the chamber beneath the spool valve 151. This results in shifting the spool valve 151 vertically upward against the constant pressure being applied to the top thereof by reason of the fact that the area of the valve 151 are unequal and the valve will shift. Shifting of the valve 151 will connect the pressure conduit 147 to both conduits 153 and 154.

Thus, by reason of the fact that the pistons 52 of the ware lowering mechanism have unequal surface areas as between their tops and bottoms, the pistons 52 will be moved downward and position the supporting heads 48 and 49 in a down position when this portion of the forming machine is temporarily put out of operation.

Contemporaneous with this placing of the ware lowering mechanism out of operation, the operator will also supply fluid under pressure to the piston rack 75 and cause the heads 48 and 49 to be laterally moved to the right out of alignment with the ware carried by the turret at the takeout station 38.

In summary, it can be seen that applicants have provided apparatus for removing formed glass articles from a forming machine which is structurally compact and has features which prevent the operation of the sweep out arms until the carriage, which carries them, is in its proper position. Also, by reason of the interconnected motors and controls therefore, the sequence of the operations carried out by the invention is predetermined and controlled by the shifting of a single main control valve, thus simplifying the timing of the various motions carried out by the mechanism.

Various modifications may be resorted to within the spirit and scope of the appended claims.

We claim:

1. A ware takeout device for a glass forming machine in which a pair of formed ware is carried by neck molds to a predetermined position and released by opening of the neck molds, comprising a pair of retractable, were receiving dead plates normally positioned at said predetermined position, means connected to said dead plates for simultaneously raising said dead plates into ware receiving position in coaxial alignment with the bottom of the ware and for lowering said dead plates and ware carried thereby until the bottom of the ware is in a fixed horizontal plane, a pair of wind boxes having flat, ware supporting, surfaces lying in said horizontal plane spaced from said dead plates and mounted parallel thereto, means connected to said dead plates for horizontally shifting said dead plates as a unit into wind box receiving position after lowering thereof, a continuously moving conveyor adjacent said wind boxes and having its upper surface moving said horizontal plane away from said wind boxes on the side opposite from the dead plates, means mounted beside the wind boxes for moving said ware laterally from said dead plates to said wind boxes and simultaneously laterally moving ware positioned on the wind boxes onto said moving conveyor, and means responsive to the movement of said ware moving means for controlling the operation of said dead plate raising and lowering means, whereby said ware is lowered from the forming machine and moved step-by-step from the dead plates to the support means.

2. A ware takeout device for a glass forming machine in which formed ware is successively carried by neck molds to a predetermined position and released from the neck mold by opening of the neck mold, comprising a retractable ware receiving dead plate normally positioned at said predetermined position, means connected to said dead plate for raising said dead plate into ware receiving position in coaxial alignment with the bottom of the ware at said predetermined position and for lowering said dead plate and the ware carried thereby until the bottom of the ware is in a predetermined horizontal plane, a wind box having a flat, ware supporting, surface lying in said horizontal plane and laterally spaced from said ware receiving dead plate, motor means connected to said dead plate for horizontally shifting said dead plate into wind box receiving position, a continuously moving conveyor having one end adjacent said wind box and having its upper surface moving in said horizontal plane in a direction away from said wind box, means for moving the ware laterally from said dead plate to said wind box and simultaneously laterally moving previously positioned ware from the wind box onto the end of said conveyor, and means responsive to the movement of said ware moving means for controlling the operation of said dead plate raising and lowering means, whereby the neck mold released ware is lowered from the forming machine and moved step-by-step from the ware receiving dead plate, to the wind box and to the conveyor.

References Cited by the Examiner
UNITED STATES PATENTS

| | | | |
|---|---|---|---|
| 2,182,167 | 12/1939 | Berthold | 65—348 |
| 2,584,836 | 2/1952 | Blumensaadt | 214—1 |
| 2,677,919 | 5/1954 | Worrest | 65—348 |
| 2,821,810 | 2/1958 | Bullers et al. | 214—1 |
| 2,833,088 | 5/1958 | Olson et al. | 65—348 |
| 3,137,394 | 6/1964 | Trudeau | 65—260 |

S. LEON BASHORE, *Acting Primary Examiner.*

DONALL H. SYLVESTER, D. CRUPAIN, F. W. MIGA, *Assistant Examiners.*

UNITED STATES PATENT OFFICE

CERTIFICATE OF CORRECTION

Patent No. 3,303,013                      February 7, 1967

Eustace H. Mumford et al.

It is hereby certified that error appears in the above numbered patent requiring correction and that the said Letters Patent should read as corrected below.

Column 8, line 72, for "were" read -- ware --.

Signed and sealed this 6th day of August 1968.

(SEAL)
Attest:

Edward M. Fletcher, Jr.                      EDWARD J. BRENNER
Attesting Officer                            Commissioner of Patents